United States Patent [19]

Tadros

[11] 4,237,025

[45] Dec. 2, 1980

[54] PRODUCT COMPRISING LIME OR LIMESTONE AND GRAHAM'S SALT OR $M_xP_nO_{(3N+1)}$

[75] Inventor: Maher E. Tadros, Ellicott City, Md.

[73] Assignee: Martin Marietta Corporation, Bethesda, Md.

[21] Appl. No.: 945,654

[22] Filed: Sep. 25, 1978

Related U.S. Application Data

[62] Division of Ser. No. 901,164, Apr. 28, 1978.

[51] Int. Cl.³ ............................................. C09K 3/00
[52] U.S. Cl. .................................. 252/192; 252/181; 423/242
[58] Field of Search ............................ 252/192, 181; 423/242 R, 242 A, 512 A, 166, 270, 271, 265, 266, 275; 210/59

[56] References Cited

U.S. PATENT DOCUMENTS 2,365,489  12/1944  Partridge .................. 423/314 X

*Primary Examiner*—Benjamin R. Padgett
*Assistant Examiner*—J. L. Barr
*Attorney, Agent, or Firm*—Wilton Rankin; Gay Chin

[57] ABSTRACT

In the process of removing oxides of sulfur from gases, comprising the step of contacting, at 2°–100° C., components comprising water, calcium ions, and sulfite ions or bisulfite ions to form a sludge, the improvement comprising contacting said components in the presence of dissolved Graham's salt or a dissolved polymer of the formula $M_xP_nO_{(3n+1)}$ to form a sludge having improved properties, wherein M is a cation, n is a positive integer greater than 1, x is $(n+2)/y$, and y is the valence of M. Resulting sludge and new composition of matter, comprising lime or limestone mixed with Graham's salt or $M_xP_nO_{(3n+1)}$, which is useful in performing the process, are also disclosed.

4 Claims, No Drawings

PRODUCT COMPRISING LIME OR LIMESTONE AND GRAHAM'S SALT OR $M_xP_nO_{(3N+1)}$

This is a division of application Ser. No. 901,164, filed Apr. 28, 1978.

The present invention relates to an improved process of removing oxides of sulfur from gases; the improved sludge resulting from the process; and a new composition of matter useful in performing the improved process.

Generally speaking, the process of the present invention may be defined as: in the process of removing oxides of sulfur from gases, comprising the step of contacting, at 2°–100° C., components comprising water, calcium ions, and sulfite ions or bisulfite ions to form a sludge, the improvement comprising contacting said components in the presence of dissolved Graham's salt or a dissolved polymer of the general formula $$M_xP_nO_{(3n+1)} \qquad \text{(Formula I)}$$

to form a sludge having improved properties, wherein the weight ratio of Ca to Graham's salt or Ca to $P_nO_{(3n+1)}$ portion of the $M_xP_nO_{(3n+1)}$ is 1:0.0015–0.2, M is a cation, n is a positive integer greater than 1, x is (n+2)/y, and y is the valence of M.

Generally speaking, the sludges of the present invention may be defined as the improved sludges produced according to the process of the present invention, which process is described generally in the preceding paragraph.

Generally speaking, the new composition of matter of the present invention may be defined as a new composition of matter comprising lime or limestone and Graham's salt or a water soluble polymer of Formula I above, which new composition may also comprise water.

The process of the present invention is particularly useful in connection with removing oxides of sulfur in the field of flue gas desulfurization, as will be described more fully below.

The sludges resulting from the process of the present invention are useful in that they have a faster initial setting rate than corresponding sludges made without use of Graham's salt or the compounds of Formula I. Sludges produced according to the present invention are also useful as land fill, or as raw material to be oxidized and converted to gypsum board.

The new composition of matter comprising lime or limestone and Graham's salt or a compound of Formula I is useful as a product for treating aqueous wastewaters comprising sulfurous acid. It is also useful as a base stock for diluting with water, or with water and more lime or limestone, to prepare aqueous compositions for precipitating calcium containing sludges from wastewaters containing sulfurous acid, or for contacting with flue gas containing oxides of sulfur to form a calcium containing sludge, or for contacting with sodium containing waters, which have previously contacted flue gas containing oxides of sulfur, to form a calcium containing sludge. Such sodium containing waters are found in the double alkali method of flue gas desulfurization.

It should be understood that the present invention works equally as well when sulfate ions are present with the sulfite ions or bisulfite ions.

Disposal of calcium sulfite containing sludges is one of the major environmental problems facing the United States of America today. Those sludges result from many industrial processes, such as desulfurization of flue gas containing sulfur dioxide, which may also contain other oxides of sulfur. Such sludges often contain both calcium sulfite hemihydrate and calcium sulfate dihydrate. Most of such sludges dewater very slowly, and some contain large amounts of water after undergoing conventional dewatering processes. Some are thixotropic. Much land is wasted as lagoons for storing such sludges, and environmentalists fear that water of ponded, low solids content sludges will eventually leak into and foul surface waters and ground waters. Large sums of money are spent by industry and utilities on constructing, operating and maintaining sludge control systems.

Several methods for dealing with or avoiding sludge problems have been proposed, but none is entirely satisfactory. Attempted solutions in the prior art have included such things as lining lagoons with concrete or plastic liners to prevent leakage of the water, which is costly; landfilling without treatment, which requires long periods for partial dewatering of the sludge, large areas of land, and often renders the land unusable for other purposes; forced oxidation in flue gas desulfurization to give a higher ratio of calcium sulfate dihydrate to calcium sulfite hemihydrate, which requires added capital equipment; ocean dumping of acid wastes, which is being curtailed by laws and regulations; filtration, which is expensive; injection of wastes into deep abandoned wells, which is subject to legal regulation and the unavailability of such abandoned deep wells in most places; drainage of untreated acid wastes into streams, which is being increasingly outlawed in a number of countries; plastering land with untreated sludge, which dries slowly and requires much land; stabilizing the sludge as a solid with expensive chemical fixatives, which further increases the total volume of the solids to be disposed of and dedicates the land permanently to storage thereof; and modifying crystal size by adjusting physical treatment conditions, which is usually very expensive because of equipment and process requirements for achieving the necessary physical conditions.

The following are some of the improvements of the present invention over the prior art.

Calcium containing sludges produced according to the process of the present invention have faster initial setting rates than corresponding sludges produced without the aid of Graham's salt or a compound of Formula I. In addition, if the lower end of the range, or the preferred range, of Graham's salt or compound of Formula I specified herein is employed, the resulting calcium containing sludges also have smaller solids containing volumes, lower viscosities, faster filtration rates, and compact to greater density than corresponding calcium containing sludges produced without Graham's salt or a compound of Formula I. I have observed in several cases, under 2,000 power magnification, that the normal crystal morphology of calcium sulfite hemihydrate was modified in that the crystals agglomerated into larger spheres than normal, and that the normal crystal morphology of calcium sulfate dihydrate was modified from needle-like to blocky by the present process, which may contribute to the foregoing properties.

Because more water can be removed from the sludge, smaller and fewer sludge lagoons will be needed, thereby saving land. The process of the present invention may be practiced at relatively low cost, because inexpensive chemicals, in small amounts, may be used. The method and new composition can be adapted to current lime or limestone neutralizations of sulfurous acid with little addition to or modification of existing equipment. For example, Graham's salt or a compound of Formula I may be fed wet or dry into the wet or dry lime or limestone, before the lime or limestone contacts sulfite or bisulfite ions. Water which is liberated from the sludge may be treated by conventional means and either recycled or returned to streams sooner and in larger quantities, thereby reducing the risk of water pollution, and thereby reducing the required storage area for impounded sludge. Increased density of the resulting sludge improves economics of materials handling, because less time and smaller equipment are needed to move the smaller volume, higher density solids. In addition, the increased density of the stored sludge makes leaching and leakage less likely. Because more water may be removed from sludge before it is placed in landfills or used as land plaster, those pollutants which are removed with the water can be treated biologically or chemically along with other wastewater, instead of going upon the land. The present method is not affected by the flyash customarily found in flue gas, nor by small amounts of MgO sometimes used with lime or limestone waters in neutralizing flue gas, nor by the presence of sodium ions found in the so-called double-alkali method of desulfurizing flue gases. Numerous other advantages will appear to those with skill in the art.

The following is a more detailed description of the present invention.

It is important that the Graham's salt or compound of Formula I be dissolved and present when the calcium ions react with sulfite or bisulfite ions. Addition of Graham's salt or compound of Formula I after formation of the calcium containing sludge gives no advantageous result.

In practicing the process of the present invention, the calcium ions may be contacted with the sulfite ions or bisulfite ions, with sulfate ions also optionally present, at 2°–100° C., and preferably at 2°–60° C.

As used herein, the term lime means any of the various chemical and physical forms of quicklime, hydrated lime, and hydraulic lime.

Graham's salt is a well known, high molecular weight, soluble glass, which may be prepared by several methods, including from monobasic sodium phosphate by prolonged fusion and rapid cooling of the melt.

The amount of Graham's salt or compound of Formula I to be used in the present process is based on the amount of calcium present. Customarily, 1 part of calcium ions to either 0.0015–0.2 parts Graham's salt or to 0.0015–0.2 parts of the $P_nO_{(3n+1)}$ present in the Formula I compound will be suitable, and 1 part calcium ions to 0.01–0.04 parts Graham's salt or $P_nO_{(3n+1)}$ is preferred. Parts of Ca to Graham's salt or $P_nO_{(3n+1)}$ are computed herein on weight basis, 100% content, dry. However, if the upper end of the stated range of Graham's salt or Formula I compound is employed, the initial settling rate of the sludge will desirably increase, and the final settled volume may undesirably increase, over those of corresponding calcium containing sludges prepared without Graham's salt or Formula I compound. The remedy for the undesirable increase in final settled volume is to adjust the amount of Graham's salt or Formula I compound downward toward the preferred range. If large amounts of heavy metal ions, such as iron, are present, larger amounts of Graham's salt or compound of Formula I may be employed to overcome the iron and achieve the desired result.

Formula I includes such compounds as sodium pyrophosphate, sodium tripolyphosphate, potassium pyrophosphate, potassium tripolyphosphate, and there are some commercial acids known to contain compounds of Formula I. Formula I compounds may be used in hydrous or anhydrous form.

The process of the present invention is useful in connection with removing oxides of sulfur from gases. For example, flue gas resulting from burning fossil fuel contains sulfur dioxide, and may also contain sulfur trioxide. When sulfur dioxide contacts water, sulfurous acid is formed, which ionizes into sulfite and bisulfite ions. If sulfur trioxide is also present, it forms sulfuric acid upon contacting water, which ionizes into sulfate ions. When flue gas is wet scrubbed by direct contact with aqueous lime or aqueous limestone, a slurry comprising calcium sulfite hemihydrate is formed, which slurry will additionally comprise calcium sulfate dihydrate if sulfur trioxide was present in the flue gas. By adding Graham's salt or compound of Formula I to the aqueous lime or limestone before it contacts the flue gas, calcium containing sludges having the above advantageous properties may be produced. The process of the present invention is also suitable for use in the so-called double alkali system of flue gas desulfurization, in which an aqueous sodium salt solution first contacts the flue gas to form sodium sulfite, sodium bisulfite, and optionally sodium sulfate, which subsequently contact lime or limestone to form calcium containing sludges and to free the sodium for recirculation. Also, the process of the present invention may be employed whether or not external air is fed into the system to convert some of the sulfite to sulfate, a process known as forced oxidation. In all those processes, at one time or another, calcium ions contact bisulfite ions or sulfite ions, and sludge comprising calcium sulfite hemihydrate is formed.

The new composition of matter of the present invention comprises lime or limestone and Graham's salt or a water soluble polymer of the formula $M_xP_nO_{(3n+1)}$, which may optionally additionally comprise water, and wherein M, x, y and n are as defined above. It may be prepared by adding the ingredients together in any desired order. In a particularly useful embodiment of that new composition, the weight ratio of calcium to Graham's salt or $P_nO_{(3n+1)}$ component of Formula I compound is 1:0.0015–0.2.

The following are illustrative examples, in which all parts are by weight unless otherwise specified. Data contained in the following tables were obtained from curves generated by plotting the height of the liquid/solid interface line of the sludge, produced by the example in question, as a function of time, under static conditions, in a 100 ml graduated cylinder. As used herein the term "initial settling rate" means the difference in the height of the liquid/solid interface between time=$t_0$ and time=$t_1$, divided by the time, $t_1$, during the initial linear portion of the above described curve. As used herein the term "final settled volume" means, from the curves described above, the volume of the solids containing portion of sludge below the liquid/solid interface, after a time period in which the interface height is essentially unchanged during 2 hours.

EXAMPLE 1

A composition of matter comprising 1 part calcium to 0.01 parts Graham's salt was prepared by adding 50 gm. CaO to 0.355 gm. Graham's salt and mixing.

EXAMPLE 2

The composition of matter described in Example 1 was diluted with 100 ml. water at room temperature with stirring.

EXAMPLE 3

A composition of matter comprising 1 part calcium to 0.2 parts of the $P_nO_{(3n+1)}$ in sodium pyrophosphate was prepared by adding 6.24 gm. sodium pyrophosphate to 50 gm. $CaCO_3$.

EXAMPLE 4

100 ml. water was added to and mixed with the composition of Example 3.

EXAMPLES 5–29

In each of Examples 5–29, 80 gm. water was mixed in a beaker with 10 gm. of the lime or limestone as indicated in column 2 of Table A below; the temperature of each mixture was adjusted to the initial temperature indicated for it at column 3 of Table A; and to each mixture was added the compound indicated at column 4 of Table A, in an amount so that the weight ratio of Ca to Graham's salt or to the $P_nO_{(3n+1)}$ in the column 4 compound employed was 1 to the number indicated at column 5 of Table A, except that if -0- is indicated in column 4 of Table A neither Graham's salt nor a compound of Formula I was employed in the example in question. Sulfur dioxide gas was bubbled into each mixture with stirring until pH 5.5 was reached for those examples in which $Ca(OH)_2$ was employed, or until pH 3.0 was reached for those examples in which $CaCO_3$ was employed. The contents of each beaker were stirred and transferred to a separate 100 ml. graduated cylinder, and allowed to stand 2 hours. "Initial settling rate" and "final settled volume" for each example was measured as described above, and the results reported in columns 6 and 7, respectively, of Table A.

The abbreviation "G.S." was used in the below Tables for Graham's salt, and -0- under Compound in the Tables indicates a control example for comparison purposes in which neither Graham's salt nor a compound of Formula I was used in the example.

TABLE A

| Ex. No. | Ca Source | T °C. | Compound | Wt. Ratio | Initial Settling Rate, ml/min | Final Settled Volume, ml |
|---|---|---|---|---|---|---|
| 5 | Ca(OH)$_2$ | 2 | -0- | 0 | 0.69 | 42 |
| 6 | " | " | G.S. | 0.002 | 0.75 | 39 |
| 7 | " | 90 | -0- | 0 | 0.26 | 59 |
| 8 | " | " | G.S. | 0.09 | 1.8 | 38 |
| 9 | " | 25 | -0- | 0 | 0.38 | 53 |
| 10 | " | " | G.S. | 0.04 | 4.2 | 21 |
| 11 | " | " | -0- | 0 | 0.38 | 53 |
| 12 | " | " | Na$_4$P$_2$O$_7$ . 10H$_2$O | 0.012 | 1.6 | 34 |
| 13 | " | " | " | 0.20 | 2.4 | 65 |
| 14 | CaCO$_3$ | " | -0- | 0 | 0.3 | 42 |
| 15 | " | " | Na$_4$P$_2$O$_7$ . 10H$_2$O | 0.012 | 4.7 | 19 |
| 16 | " | 95 | -0- | 0 | 4.0 | 40 |
| 17 | " | " | Na$_4$P$_2$O$_7$ . 10H$_2$O | 0.08 | 7.4 | 26 |
| 18 | " | 5 | -0- | 0 | 0.10 | 41 |
| 19 | " | " | Na$_4$P$_2$O$_7$ . 10H$_2$O | 0.0012 | 0.12 | 15 |
| 20 | Ca(OH)$_2$ | 2 | -0- | 0 | 0.69 | 42 |
| 21 | " | " | Na$_4$P$_2$O$_7$ . 10H$_2$O | 0.08 | 2.5 | 35 |
| 22 | " | 90 | -0- | 0 | 0.26 | 59 |
| 23 | " | " | Na$_4$P$_2$O$_7$ . 10H$_2$O | 0.08 | 2.1 | 31 |
| 24 | CaCO$_3$ | 25 | -0- | 0 | 0.3 | 42 |
| 25 | " | " | Na$_4$P$_2$O$_7$ | 0.01 | 6.4 | 32 |
| 26 | Ca(OH)$_2$ | " | -0- | 0 | 0.38 | 53 |
| 27 | " | 27 | Na$_5$P$_3$O$_{10}$ | 0.0013 | 0.73 | 48 |
| 28 | " | 26 | " | 0.027 | 6.4 | 21 |
| 29 | " | 25 | " | 0.13 | 7.6 | 37 |

EXAMPLES 30–37

The procedure of Examples 30–37 is the same as the procedure of Examples 5–29 above, except that after the bubbling of sulfur dioxide gas into each mixture, air was bubbled into each mixture, with stirring, for about 2 hours. Table B relates to Examples 30–37 in the same way that Table A relates to Examples 5–29.

TABLE B

| Ex. No. | Ca Source | T,°C. | Compound | Wt. Ratio | Initial Settling Rate, ml/min | Final Settled Volume, ml |
|---|---|---|---|---|---|---|
| 30 | CaCO$_3$ | 5 | -0- | 0 | 0.1 | 41 |
| 31 | " | " | G.S. | 0.003 | 19.0 | 9 |
| 32 | " | " | " | 0.2 | 3.2 | 20 |
| 33 | " | 95 | -0- | 0 | 4.0 | 40 |
| 34 | " | " | G.S. | 0.003 | 4.3 | 28 |
| 35 | " | " | " | 0.03 | 11.0 | 17 |
| 36 | " | 25 | -0- | 0 | 0.3 | 42 |
| 37 | " | " | G.S. | 0.03 | 24.0 | 16 |

EXAMPLES 38–43

In each of Examples 38–43, 80 gm. water was adjusted to the temperatures indicated for each example at column 3 of Table C; to each water was added sufficient Graham's salt so that the weight ratio of Ca to Graham's salt employed in each example was 1 to the number indicated in column 5 of Table C; 10 gm. finely divided CaCO$_3$ was added to each water with mixing; into each water, SO$_2$ gas was introduced with stirring, and 1 minute after commencing the SO$_2$, and during the 9 minutes additional introduction of the SO$_2$, 2.02 gm. 50% aqueous H$_2$SO$_4$ was added to each water at the rate of 2 drops/30 seconds. SO$_2$ was discontinued when pH 3.0 was obtained. The resulting slurries were sparged separately with air for 2 hours, mixed and transferred to separate 100 ml. graduated cylinders, and left standing 2 hours. "Initial settling rate" and "final settled volume" for each example is recorded in Table C below.

TABLE C

| Ex. No. | Ca Source | T,°C. | Compound | Wt. Ratio | Initial Settling Rate, ml/min | Final Settled Volume, ml |
|---|---|---|---|---|---|---|
| 38 | CaCO$_3$ | 2 | -0- | 0 | 1.25 | 35 |
| 39 | " | " | G.S. | 0.003 | 1.81 | 32 |
| 40 | " | 95 | -0- | 0 | Solidified before completion | |
| 41 | " | " | G.S. | 0.2 | 3.1 | 25 |

TABLE C-continued

| Ex. No. | Ca Source | T,°C. | Compound | Wt. Ratio | Initial Settling Rate, ml/min | Final Settled Volume, ml |
|---|---|---|---|---|---|---|
| 42 | " | 25 | -0- | 0 | 0.57 | 43 |
| 43 | " | " | G.S. | 0.03 | 62.0 | 24 |

EXAMPLES 44–48

In each of Examples 44–48, 80 gm. water was adjusted to the temperature indicated for each example at column 3 of Table D below. Graham's salt was added to each water in sufficient amount so that the weight ratio of Ca to Graham's salt employed in each example was 1 to the number indicated at column 5 of Table D. Ten gm. finely divided $Ca(OH)_2$ was added to each aqueous solution of Graham's salt. $SO_2$ was bubbled into each for 15 minutes, and 1 minute after commencing the $SO_2$, feeding of 1.547 gm. 95.7% $H_2SO_4$ into each was commenced. The $H_2SO_4$ was fed for 4 minutes at 1 drop/30 seconds and afterwards at 1 drop/minute for 11 minutes. The resulting slurries had pH 5.5. Each resulting slurry was mixed, transferred to a separate 100 ml. graduated cylinder, and allowed to stand 2 hours. The results are indicated in Table D below.

TABLE D

| Ex. No. | Ca Source | T,°C. | Compound | Wt. Ratio | Initial Settling Rate, ml/min | Final Settled Volume, ml |
|---|---|---|---|---|---|---|
| 44 | $Ca(OH)_2$ | 25 | -0- | 0 | 0.44 | 51 |
| 45 | " | " | G.S. | 0.002 | 1.51 | 35 |
| 46 | " | " | " | 0.02 | 2.53 | 29 |
| 47 | " | 95 | -0- | 0 | 0.08 | 72 |
| 48 | " | " | G.S. | 0.2 | 0.90 | 40 |

EXAMPLES 49–50

In each of Examples 49–50, 80 gm. water at 25° C. was mixed in a beaker with sufficient Graham's salt so that the weight ratio of Ca to Graham's salt employed in each example was 1 to the number for Graham's salt indicated in column 5 of Table E; 1 gm. fly ash from a commercial coal burning electric utility station and 10 gm. finely divided $Ca(OH)_2$ were added to each beaker with mixing; and $SO_2$ gas was bubbled in until the resulting slurries were pH 5.5. Each slurry was transferred to a 100 ml. graduated cylinder and allowed to stand 2 hours. The results are in Table E below.

TABLE E

| Ex. No. | Ca Source | T,°C. | Compound | Wt. Ratio | Initial Settling Rate, ml/min | Final Settled Volume, ml |
|---|---|---|---|---|---|---|
| 49 | $Ca(OH)_2$ | 25 | -0- | 0 | 0.40 | 53 |
| 50 | " | " | G.S. | 0.04 | 3.06 | 24 |

EXAMPLES 51–52

In each of Examples 51–52, 10 gm. $NaHSO_3$ was dissolved in 90 ml. water at 60° C. in a beaker, and sufficient Graham's salt was added to provide the weight ratio of Ca to Graham's salt of 1 to the number for Graham's salt indicated in column 5 of Table F below; 10 gm. $Ca(OH)_2$ was added, and stirred 20 minutes. The resulting slurries were transferred to separate 100 ml. graduated cylinders and allowed to stand for 2 hours. The results are reported in Table F below.

TABLE F

| Ex. No. | Ca Source | T,°C. | Compound | Wt. Ratio | Initial Settling Rate, ml/min | Final Settled Volume, ml |
|---|---|---|---|---|---|---|
| 51 | $Ca(OH)_2$ | 60 | -0- | 0 | 5.2 | 44 |
| 52 | " | " | G.S. | 0.04 | 5.9 | 35 |

EXAMPLES 53–55

In each of Examples 53–55, 80 gm. water at 25° C. was placed in separate beakers. Enough Graham's salt was added to each beaker, with mixing, to provide the weight ratio of Ca to Graham's salt of 1 to the number for Graham's salt indicated in column 5 of Table G below; 0.53 gm. MgO was added to each with mixing, followed by 10 gm. $Ca(OH)_2$ to each with mixing. $SO_2$ gas was bubbled into each with stirring until the resulting slurries reached pH 5.5. The slurries were transferred to separate 100 ml. graduated cylinders and allowed to settle for 2 hours. The results are in Table G below.

TABLE G

| Ex. No. | Ca Source | T,°C. | Compound | Wt. Ratio | Initial Settling Rate, ml/min | Final Settled Volume, ml |
|---|---|---|---|---|---|---|
| 53 | $Ca(OH)_2$ | 25 | -0- | 0 | 0.43 | 54.5 |
| 54 | " | " | G.S. | 0.018 | 2.13 | 28 |
| 55 | " | " | " | 0.037 | 4.85 | 20 |

What is claimed is:

1. A new composition of matter consisting of lime or limestone and Graham's salt or a water soluble polymer of the formula $M_xP_nO_{(3n+1)}$, wherein M is a cation, n is a positive integer greater than 1, x is $(n+2)/y$, and y is the valence of M.

2. A new composition of matter consisting of lime or limestone, Graham's Salt or a water soluble polymer of the formula $M_xP_nO_{(3n+1)}$, and water, wherein M is a cation, n is a positive integer greater than 1, x is $(n+2)/y$, and y is the valence of M.

3. A new composition of matter comprising lime or limestone and Graham's Salt or a water soluble polymer of the formula $M_xP_nO_{(3n+1)}$, wherein M is a cation, n is a positive integer greater than 1, x is $(n+2)/y$, y is the valence of M, and the weight ratio of calcium ions to Graham's Salt or Ca to $P_nO_{(3n+1)}$ is 1:0.0015–0.2.

4. A new composition of matter as defined in claim 3 and also comprising water.

* * * * *